United States Patent [19]

Kerg

[11] 4,260,669

[45] Apr. 7, 1981

[54] ALKALINE-MNO₂ CELL HAVING A ZINC POWDER-GEL ANODE CONTAINING STARCH GRAFT COPOLYMER

[75] Inventor: Catherine A. Kerg, Lakewood, Ohio

[73] Assignee: Union Carbide Corporation, New York, N.Y.

[21] Appl. No.: 130,368

[22] Filed: Mar. 14, 1980

[51] Int. Cl.³ .............................................. H01M 4/60
[52] U.S. Cl. ..................................... 429/215; 429/224; 429/229
[58] Field of Search ........................ 429/212, 215–217, 429/229, 224

[56] References Cited

U.S. PATENT DOCUMENTS

| | | | |
|---|---|---|---|
| 2,938,064 | 5/1960 | Kordesch | 429/27 |
| 2,993,947 | 7/1961 | Leger | 429/166 |
| 3,871,918 | 3/1975 | Viescou | 429/212 X |
| 3,884,721 | 5/1975 | Tucholski | 429/212 X |
| 4,175,052 | 11/1979 | Norteman, Jr. | 429/212 X |

OTHER PUBLICATIONS

"Safety of SGP502S Absorbent Polymer", Henkel Corp. pp.1–6.

*Primary Examiner*—Charles F. LeFevour
*Attorney, Agent, or Firm*—Cornelius F. O'Brien

[57] ABSTRACT

An alkaline-MnO₂ cell employing a zinc powder-gel anode in which the gelling agent is starch graft copolymer with or without one or more other gelling agent such as sodium carboxymethyl cellulose.

12 Claims, No Drawings

ALKALINE-MNO₂ CELL HAVING A ZINC POWDER-GEL ANODE CONTAINING STARCH GRAFT COPOLYMER

FIELD OF THE INVENTION

The invention relates to zinc powder-gel anodes for alkaline-MnO$_2$ cells and specifically to such anodes wherein the gelling agent is starch graft copolymer with or without an additional gelling agent such as sodium carboxymethyl cellulose (CMC), methyl cellulose (MOC), poly-N-vinyl pyrrolidone (P-N-V-P), polymethacrylic acid (PMA) or the like.

BACKGROUND OF THE INVENTION

A conventional type of alkaline cell employs a cathode comprising predominantly an oxidic depolarizer such as manganese dioxide usually admixed with a binder and conductive material such as graphite, steel wool and the like. The anode usually comprises a consumable anodic material such as powder zinc admixed with a gelling agent such as carboxymethyl cellulose, a suitable alkaline electrolyte such as an aqueous potassium hydroxide solution and, if desired, mercury. The anode gel is then extruded to form a desired shaped electrode. Anode materials and their preparation are described in U.S. Pat. Nos. 2,938,064 and 2,935,547 issued to K. Kordesch and U.S. Pat. No. 2,993,947 issued to E. E. Leger. The above electrodes together with conventional separator material can be assembled into an alkaline-MnO$_2$/zinc cell.

Discharging the above described cell on a microampere drain or on very intermittent discharge has resulted in zinc oxide formation in the separator which can result in internal shorts. Specifically, zinc oxide in contact with metallic zinc is known to be conductive and an internal electronic path is formed between the anode and cathode. An investigation of the internal shorting problem has revealed the carboxymethyl cellulose to be a major contributor to the transporting and precipitating of the zinc oxide throughout the cell. This internal shorting causes wasteful consumption of the components of the cell resulting in lower output capacity.

In eliminating or reducing carboxymethyl cellulose in powder-gel anodes, U.S. application Ser. No. 892,313 now U.S. Pat. No. 4,209,577 discloses a powder-gel anode comprising a major portion of a consumable anode material such as zinc, a minor amount of a gelling agent such as methyl cellulose with or without carboxymethyl cellulose and an aqueous alkaline electrolyte such as an aqueous potassium hydroxide solution. U.S. Pat. No. 4,175,052 discloses a powder-gel anode comprising a major portion of a consumable anodic material such as zinc, a minor amount of a gelling agent such as poly-N-vinyl pyrrolidone and/or polymethacrylic acid with or without carboxymethyl cellulose and an aqueous alkaline electrolyte such as an aqueous potassium hydroxide solution. Both the '313 application and the '052 patent are incorporated herein by reference.

Although a gelling agent is required, it is desirable to utilize a gelling agent that enables a cell to function at a given efficiency with a minimum amount of the gelling agent so that a larger volume of the active components such as zinc and manganese dioxide can be put in the cell. The gelling agent is particularly important for cells intended to operate on high discharge rates such as is required for toys, movie cameras, camera flash units and the like. The efficiency of anode utilization (normally the limiting factor in high rate service) is strongly affected by the gelling agent since the gelling agent affects the distribution and availability of electrolyte and the distribution of discharge products. In addition, it functions to keep the particulate anode material in a suspended state for greater electrolyte availability and better current density distribution. Consequently, the selection of a gelling agent is of primary importance in the fabrication of powder-gel anodes.

It is an object of the present invention to provide an alkaline-MnO$_2$/zinc cell that can be discharged on microampere drains without internally shorting and also on high current drains at effectively high anode utilization.

It is another object of the present invention to provide a powder-gel anode for alkaline-MnO$_2$ cells that requires less of a gelling agent thereby permitting more of the active anodic material to be employed in a given anode mix volume.

It is another object of the present invention to provide a powder-gel anode for alkaline-MnO$_2$ cells that employs a starch graft copolymer with or without another gelling agent.

It is another object of the present invention to provide a powder-gel anode comprising powder zinc, a starch graft copolymer with or without another gelling agent and an aqueous alkaline electrolyte.

The foregoing and additional objects will become more fully apparent from the following description.

SUMMARY OF THE INVENTION

The invention broadly relates to powder-gel anodes comprising a major portion (over 50% by weight) of a consumable anode material such as zinc, a minor amount (less than about 6% by weight) of a gelling agent such as a starch graft copolymer with or without one or more other gelling agent, and an aqueous alkaline electrolyte such as a starch graft copolymer with or without one or more other gelling agent, and an aqueous alkaline electrolyte such as an aqueous potassium hydroxide solution.

The starch graft copolymer for use in this invention is one in which the copolymer contains carboxylate units preferably acrylate units. Suitable starch graft copolymers for this invention can be derived from corn starch and acrylonitrile.

A commercial starch graft copolymer is starch-g-poly-(acrylamide-co-sodium acrylate) having the formula

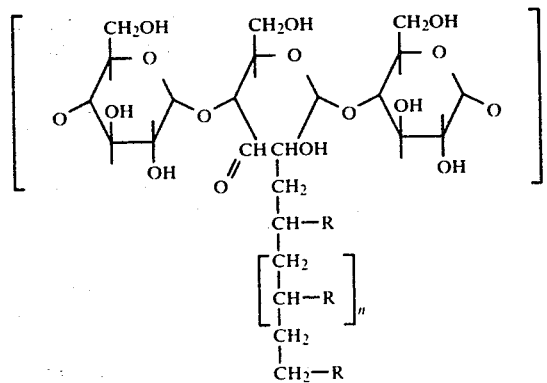

where n is about 1000 and R=CONH$_2$, —CO$_2$Na, or —CO$_2$K.

Although the polymer structure shows grafting at the C$_2$ position, grafting at the C$_3$ position would also be suitable. Commercial strach graft copolymers are available under the tradename SGP from Henkel Corporation, Minneapolis, Minn., and Stasorb from A. E. Staley Mfg Co. Examples of suitable starch graft copolymers would be SGP 145, SGP 502S, SGP 104, and SGP 136 from Henkel Corporation and Stasorb 372 from A. E. Staley Manufacturing Company. The Stasorb 372 material is made from a mixture of starch and potassium acrylate which is polymerized, grafted and crystallized in a single step to yield a starch-polyacrylate block copolymer.

A preferred starch graft copolymer for use in this invention is starch grafted with polymerized acrylonitrile and then hydrolyzed with NaOH or KOH to convert polyacrylonitrile blocks to a mixture of acrylamide and sodium (or potassium) acrylate functional groups. This type of material can be obtained commercially from Henkel Corporation under the tradename SGP-145. The above material could also be neutralized with HCL to convert sodium acrylate functional groups to acrylic acid groups. If desired, a surfactant such as a salt of a fatty acid could be added to improve its wettability and dispersability so as to minimize any clumping or mixing problems that may be encountered during anode fabrication.

In the fabrication of a powder-gel anode in accordance with this invention, a starch graft copolymer is blended with zinc or amalgamated zinc powder and the electrolyte. The anode can be fabricated with a major amount of the anode's electrolyte (flowable type anode mix) or with a minor amount of the anode's electrolyte (extrudable type anode mix) whereupon the remainder of the anode's electrolyte would be added during cell assembly to produce an alkaline cell.

The amount of the starch graft copolymer to be incorporated in the powder-gel anode can vary between about 0.7 and about 3.0 percent by weight of the anodic material such as zinc. Preferably, the starch graft copolymer should be added in an amount between about 0.8 and about 1.2 percent by weight of the anodic material. Since the amount of the electrolyte to be employed in the powder-gel anode can vary, then the amount of starch graft copolymer to be added could alternatively be based on the total weight of the electrolyte solution and thus vary between about 0.5 percent and about 5 percent by weight and preferably between about 1.2 and about 1.8 percent by weight.

It is within the scope of this invention to add other gelling agents such as carboxymethyl cellulose, polyacrylamide, methyl cellulose, polyacrylates, hydroxy alkyl cellulose, polymethacrylic acid, poly-N-vinyl pyrrolidone or the like along with the starch graft copolymer to powder-gel anode formulations. For example, one advantage in the use of carboxymethyl cellulose is that it will cause the anode to swell on contact with the cell electrolyte thereby providing good anode-separator-cathode interfaces for optimum cell service. Although the anode of the invention can be appropriately formed and positioned to make good contact against the separator/cathode of the cell before the electrolyte is added, it is within the scope of this invention to use a reduced amount of carboxymethyl cellulose along with a starch graft copolymer in the formation of powder-gel anodes. Thus the advantage of the swelling characteristics obtained through the use of carboxymethyl cellulose can be utilized without the disadvantage of internal shorting since the amount of carboxymethyl cellulose to be used can be greatly reduced from the amount that would normally be employed. For example, normally carboxymethyl cellulose is employed in the powder-gel anodes described in the above identified patents in an amount of about 4 to 6 percent based on the weight of the zinc, while the amount which can be used along with a starch graft copolymer in accordance with this invention is only about 2 to 3 percent based on the weight of the zinc.

Preferably, the starch graft copolymer can vary between about 0.5 and about 1.5 percent and the carboxymethyl cellulose can vary between about 2 and about 3 percent based on the weight of the zinc. For example, a powder-gel anode was produced employing 83.25% amalgamated (6% Hg) zinc powder, 1.94% carboxymethyl cellulose, 0.71% starch graft copolymer and 14.1% of an aqueous potassium hydroxide electrolyte (0.1 normal). Based on this formulation, the starch graft copolymer was 0.9% by weight of the zinc, and the CMC was 2.4% by weight of the zinc. Powder-gel anodes of this type were employed in alkaline-MnO$_2$ cells and when compared to similar cells with more CMC and without starch graft copolymer, the cells showed no internal shorting on low-rate discharge testing while the control cells which employed only carboxymethyl cellulose showed internal shorting.

In addition, since methyl cellulose is a good non-ionic binder and gelling agent, it could also be mixed along with the starch graft copolymer and carboxymethyl cellulose to produce powder-gel anodes. For example, a powder-gel anode was produced employing 85.3% amalgamated (6% Hg) zinc powder, 0.5% starch graft copolymer, 1.5% carboxymethyl cellulose, 2.5% methyl cellulose and 10.2% of an aqueous potassium hydroxide electrolyte (0.1 N). Based on this formulation, the starch graft copolymer was 0.6% by weight, the CMC was 1.9% by weight and the methyl cellulose was 3.1% by weight based on the weight of the zinc powder. Powder-gel anodes of this type were employed in alkaline-MnO$_2$ cells and upon testing were found acceptable.

EXAMPLE 1

Three test lots of alkaline-MnO$_2$ cells were constructed using the following components: cathode:
 18.8 g. manganese dioxide
 2.2 g. graphite
 0.5 g. acetylene black
 2.8 g. 37% KOH solution and
 1.0 g. Portland Cement
combined anode/electrolyte:
 7.94 g. powdered zinc (about 60 Tyler Mesh)
 7.8 g. 34.6% KOH solution
 0.475 g. mercury and
 a gelling agent with or without a surfactant as shown in Table 1.

The above components, along with a fibrous cellulosic separator, were assembled in a conductive housing and cells from the three test lots were discharged across various loads until various cutoff voltage levels were reached. The average open circuit voltage, flash current and time required to reach the cutoff voltages for each test lot are shown in Table 1.

TABLE 1

| Cell Test Lot | Anode Additives (grams) | | | Open Circuit Voltage | Flash Current Amperes | 4-ohm load to (minutes) | | | | 25-ohm load to (hours) | | | |
|---|---|---|---|---|---|---|---|---|---|---|---|---|---|
| | CMC* | SGP** | Surfactant*** | | | 1.0v | 0.9v | 0.75v | Anode eff. | 1.0v | 0.9v | 0.75v | Anode eff.**** |
| 1 | 0.475 | | | 1.57 | 7.2 | 559 | 678 | 725 | 50% | 86 | 96 | 104 | 75% |
| 2 | | 0.070 | | 1.57 | 9.0 | 621 | 795 | 977 | 66% | 90 | 105 | 119 | 84% |
| 3 | | 0.070 | 0.084 | 1.57 | 8.2 | 542 | 780 | 1001 | 65% | 87 | 101 | 125 | 85% |

*CMC – sodium carboxymethyl cellulose
**SGP – starch graft copolymer obtained from Henkel Corp. as SGP-502S
***Surfactant was octylphenoxypolyethoxy ethanol
****Anode efficiency to 0.75 volt cutoff As evident from the data shown in Table 1, a starch graft copolymer can beneficially be used as a substitute for the carboxymethyl cellulose in zinc powder-gel cells. As also shown in the data in Table 1, the starch graft copolymer-containing cells exhibited longer service life under various loads than the carboxymethyl cellulose-containing cells.

EXAMPLE 2

Cells of Test Lots 1, 2 and 3 as described in Example 1 were produced and tested under various loads to various cutoff voltage levels. Some of the cells were tested fresh while others were stored for various periods at different temperatures. The average open circuit voltage and flash current data so obtained are shown in Tables 2 and 3. As evident from the data shown in Table 2 cells containing the starch graft copolymer gave better voltage maintenance, and equivalent net cell bulge, said cell bulge being indicative of gas build up within the cell. As evident from Table 3, the starch graft copolymer-containing cells provided better service life to 0.75 volt cutoff even after the cells were stored at an elevated temperature for three months.

cathode 76.0 g. manganese dioxide
7.5 g. graphite
1.8 g. acetylene black
11.2 g. KOH 37% solution and
3.5 g. Portland Cement anode 56.6 g. powdered zinc (abut 60 Tyler Mesh size)
0.6 g. surfactant-octylphenoxy polyethoxy ethanol
3.4 g. mercury, and a gelling agent with an electrolyte solution as shown in Table 4 to make 100 grams of anode mix.

The above components, along with a fibrous cellulosic separator, moistened with 1 to 4 grams of 40% KOH solution, were assembled in a conductive housing and cells from the five test lots were discharged across various loads until various cutoff voltage levels were reached. The average open circuit voltage and time required to reach the cutoff voltage are shown in Table 4.

As evident from the data the cells containing the

TABLE 2

| | Fresh | | 3 months at 45° C. | | | 18 weeks at 54° C. | | | 8 weeks at 71° C. | | |
|---|---|---|---|---|---|---|---|---|---|---|---|
| Cell Test Lot | Open Circuit Volt | Flash Current Ampere | Open Circuit Volt | Flash Current Ampere | Net Bulge Inch | Open Circuit Volt | Flash Current Ampere | Net Bulge Inch | Open Circuit Volt | Flash Current Ampere | Net Bulge Inch |
| 1 | 1.57 | 7.2 | 1.52 | 3.8 | 0.014 | 1.47 | 4.4 | 0.006 | 1.44 | 3.3 | 0.011 |
| 2 | 1.57 | 9.0 | 1.55 | 5.3 | 0.005 | 1.51 | 5.2 | 0.010 | 1.49 | 2.6 | 0.018 |
| 3 | 1.57 | 8.2 | 1.56 | 4.6 | 0.003 | 1.52 | 5.2 | 0.008 | 1.50 | 3.6 | 0.010 |

TABLE 3

| Cell Test Lot | 4-ohm load to* (minutes) | | | 25-ohm load to* (hours) | | | 4-ohm load to** (minutes) | | | 25-ohm load to** (hours) | | |
|---|---|---|---|---|---|---|---|---|---|---|---|---|
| | 1.0v | 0.9v | 0.75v | 1.0v | 0.9v | 0.75v | 1.0v | 0.9v | 0.75v | 1.0v | 0.9v | 0.75v |
| 1 | 559 | 678 | 725 | 86 | 96 | 104 | 373 | 568 | 666 | 81 | 90 | 93 |
| 2 | 621 | 795 | 977 | 90 | 105 | 119 | 429 | 692 | 854 | 86 | 101 | 116 |
| 3 | 542 | 780 | 1001 | 87 | 101 | 125 | 301 | 550 | 810 | 82 | 102 | 124 |

*Fresh cells
**Cells stored for 3 months at 45° C.

EXAMPLE 3

Five test lots of alkaline-MnO$_2$ cells (nominal 7.2 ampere hour capacity) were constructed using electrodes formed from the following mixes:

starch graft copolymer provided excellent service life under various load conditions.

TABLE 4

| Cell Test Lot | Anode Additive (% Anode Mix) | | Open Circuit Volt | Flash Current Ampere | 4 ohm load to (minutes) | | | 25 ohm load to (hours) | | |
|---|---|---|---|---|---|---|---|---|---|---|
| | *SGP | 40% KOH | | | 1.0V | 0.9V | 0.75V | 1.0V | 0.9V | 0.75V |
| 4 | 0.4% | 39.0% | 1.58 | 9.7 | 516 | 785 | 1100 | 102 | 114 | 138** |
| 5 | 0.5% | 38.9% | 1.58 | 11.0 | 515 | 764 | 1040 | 101 | 114 | 139** |
| 6 | 0.7% | 38.7% | 1.58 | 9.3 | 502 | 751 | 987 | 100 | 112 | 136** |
| 7 | 1.0% | 38.4% | 1.58 | 6.9 | | | | 100 | 113 | 137 |

TABLE 4-continued

| Cell Test Lot | Anode Additive (% Anode Mix) *SGP | Anode Additive (% Anode Mix) 40% KOH | Open Circuit Volt | Flash Current Ampere | 4 ohm load to (minutes) 1.0V | 4 ohm load to (minutes) 0.9V | 4 ohm load to (minutes) 0.75V | 25 ohm load to (hours) 1.0V | 25 ohm load to (hours) 0.9V | 25 ohm load to (hours) 0.75V |
|---|---|---|---|---|---|---|---|---|---|---|
| 8 | 1.5% | 37.9% | 1.58 | 5.3 | | | | 101 | 113 | 136 |

*SGP = starch graft copolymer obtained from Henkel Corp. as SGP-502S.
**Discharged at 4 hours/day.

EXAMPLE 4

Three test lots of alkaline-MnO$_2$ cells (nominal 2.15 ampere hour capacity) were constructed using electrodes containing the following:

cathode 5.88 g. manganese dioxide
0.55 g. graphite
0.11 g. acetylene black and
0.77 g. KOH (37% solution)

anode 2.59 g. powdered zinc (about 60 Tyler Mesh size)
0.155 g. mercury
and an electrolyte solution and gelling agents as shown in Table 5.

The above components, along with a fibrous cellulosic separator, were assembled in a conductive housing and cells from the three test lots were discharged across various loads until various cutoff voltage levels were reached. The average open circuit voltage and time required to reach the cutoff voltage are shown in Table 5.

As evident from the data shown in Table 5, a starch graft copolymer can beneficially be used as a substitute for some or all of the carboxymethyl cellulose in zinc powder-gel cells. As evident from the data, the cells containing the starch graft copolymer provide excellent service life under various load conditions and at extremely low temperature conditions.

EXAMPLE 5

Four test lots of alkaline-MnO$_2$/zinc cells were constructed using electrodes formed from the following mixes:

cathode 18.8 g. manganese dioxide
2.2 g. graphite
0.5 g. acetylene black
2.8 g. KOH (37%)
1.0 g. Portland Cement combined anode/electrolyte 7.94 g. powdered zinc (about 60 Tyler Mesh size)
8.34 g. 40% KOH solution
0.475 g. mercury
and a starch graft copolymer as shown in Table 6.

The above components, along with a separator of a fibrous cellulosic material, were assembled in a conductive housing and then discharged across various loads, and the times it took to reach various cutoff voltages were observed. The average open circuit voltage, flash current and discharge times to cutoff data are shown in Table 6. Some of the cells in each test lot were stored at 54° C. or 71° C. for various time periods and then the average open circuit voltage and current were observed along with the average time it took to reach various cutoff voltages. The data so obtained are also shown in Table 6. As evident from the data in Table 6, the starch graft copolymer-containing cells can function well after high temperature storage.

TABLE 5

| Cell Test Lot | Anode Additive (Grams in Anode) *SGP | Anode Additive (Grams in Anode) **CMC | Anode Additive (Grams in Anode) KOH | Open Circuit Volt | Flash Current Ampere | 4-ohm load to (minutes) 1.1V | 4-ohm load to (minutes) 0.9V | 4-ohm load to (minutes) 0.75V | 400-ohm load to (hours) 1.1V | 400-ohm load to (hours) 0.9V | 400-ohm load to (hours) 0.75V | ***4-ohm load to (minutes) 0.9V | ***4-ohm load to (minutes) 0.75V |
|---|---|---|---|---|---|---|---|---|---|---|---|---|---|
| 9 | — | 0.155 | 2.8 + | 1.57 | 8.0 | 130 | 261 | 323 | 214 | 319 | 341**** | 13 | 24 |
| 10 | 0.023 | 0.064 | 2.9 ++ | 1.57 | 8.9 | 123 | 233 | 285 | 472 | 676 | 704 | 12 | 20 |
| 11 | 0.023 | — | 2.7 +++ | 1.59 | 9.4 | 116 | 258 | 318 | 444 | 596 | 620 | 48 | 62 |

*SGP = starch graft copolymer obtained from Henkel Corp. SGP-502S
**CMC = carboxymethyl cellulose
***Tested at −20° C.
****Internal shorting occurred
+ 38.6% KOH Solution
++ 37.7% KOH Solution
+++ 40% KOH Solution

TABLE 6

| Cell Test Lot | Starch graft Copolymer Additive to Anode Mix | Open Circuit Volt | Flash Current Ampere | 4 ohm load to (minutes) 1.0v | 4 ohm load to (minutes) 0.9v | 4 ohm load to (minutes) 0.75v | 25-ohm load to (hours) 1.0v | 25-ohm load to (hours) 0.9v | 25-ohm load to (hours) 0.75v |
|---|---|---|---|---|---|---|---|---|---|
| 12 | SGP-502S (0.070 g.) | 1.58 | 9.6 | 547 | 720 | 969 | 79 | 91 | 119 |
| 12A | SGP-502S (0.070 g.) | 1.55 | 3.8 | 145 | 225 | 439 | 45 | 94 | 129 |
| **12B | SGP-502S (0.070 g.) | 1.50 | 2.0 | — | — | — | 15 | 23 | 116 |
| 13 | SGP-145- (0.105 g.) | 1.58 | 9.2 | 505 | 702 | 944 | 86 | 101 | 117 |
| *13A | SGP-145- (0.105 g.) | 1.55 | 4.7 | 193 | 337 | 737 | 71 | 96 | 122 |
| **13B | SGP-145- (0.105 g.) | 1.50 | 2.4 | — | — | — | 17 | 33 | 117 |
| 14 | SGP-104 (0.105 g.) | 1.58 | 8.8 | 555 | 730 | 945 | 80 | 97 | 121 |

TABLE 6-continued

| Cell Test Lot | Starch graft Copolymer Additive to Anode Mix | Open Circuit Volt | Flash Current Ampere | 4 ohm load to (minutes) | | | 25-ohm load to (hours) | | |
|---|---|---|---|---|---|---|---|---|---|
| | | | | 1.0v | 0.9v | 0.75v | 1.0v | 0.9v | 0.75v |
| *14A | SGP-104 (0.105 g.) | 1.55 | 4.3 | 214 | 338 | 729 | 67 | 99 | 126 |
| **14B | SGP-104 (0.105 g.) | 1.50 | 2.7 | — | — | — | 11 | 19 | 111 |
| 15 | SGP-136 (0.140 g.) | 1.58 | 9.3 | 495 | 619 | 798 | 84 | 96 | 119 |
| *15A | SGP-136 (0.140 g.) | 1.53 | 2.4 | 222 | 340 | 573 | 28 | 92 | 132 |
| **15B | SGP-136 (0.140 g.) | 1.44 | 2.7 | — | — | — | 19 | 31 | 118 |

*Test conducted after cells were stored for 1 month at 54°C.
**Test conducted after cells were stored for 8 weeks at 71°C.
***The various starch graft copolymers listed were all obtained from Henkel Corp.

What is claimed is:

1. A powder-gel anode comprising a major portion of a consumable zinc anodic material, a minor amount of a starch-graft copolymer in which the copolymer contains carboxylate units, and an aqueous alkaline electrolyte solution.

2. The powder-gel anode of claim 1 wherein the consumable zinc anodic material is a powder.

3. The powder-gel anode of claim 2 wherein the starch graft copolymer is present in an amount between about 0.7 and about 3% by weight of the anodic material.

4. The powder-gel anode of claim 3 wherein the starch graft copolymer is present in an amount between about 0.8 and about 1.2% by weight of the anodic material.

5. The powder-gel anode of claim 1 wherein a minor amount of at least one gelling agent selected from the group consisting of carboxymethyl cellulose, methyl cellulose, polyacrylates, hydroxyl alkyl cellulose, polyacrylamide, polymethacrylic acid and poly-N-vinyl pyrrolidone is contained in the powder-gel anode.

6. The powder-gel anode of claim 5 wherein the starch graft copolymer varies between about 0.5 and about 1.5 percent and the carboxymethyl cellulose between about 2 and about 3 percent based on the weight of the zinc.

7. The powder-gel anode of claim 1, 2, 3, 4, 5, or 6 wherein the electrolyte solution is aqueous potassium hydroxide.

8. An alkaline-$MnO_2$ cell employing an aqueous alkaline electrolyte solution and a powder-gel anode comprising a major portion of a consumable zinc anodic material, a minor amount of a starch graft copolymer in which the copolymer contains carboxylate units, and an aqueous electrolyte solution.

9. The alkaline-$MnO_2$ cell of claim 8 wherein the electrolyte solution is aqueous potassium hydroxide.

10. The alkaline-$MnO_2$ cell of claim 8 or 9 wherein the starch graft copolymer is present in an amount between about 0.7 and about 3% by weight of the anodic material in the cell.

11. The alkaline-$MnO_2$ cell of claim 8 or 9 wherein the starch graft copolymer is present in an amount between about 0.5 and about 5% by weight of the total electrolyte solution.

12. The alkaline-$MnO_2$ cell of claim 8 or 9 wherein the powder-gel anode contains at least one gelling agent selected from the group consisting of carboxymethyl cellulose, methyl cellulose, polyacrylates, hydroxyl alkyl cellulose, polyacrylamide, polymethacrylic acid and poly-N-vinyl pyrrolidone.

* * * * *

Notice of Adverse Decision in Interference

In Interference No. 100,730, involving Patent No. 4,260,669, C. A. Kerg, ALKALINE-MNO2 CELL HAVING A ZINC POWDER-GEL ANODE CONTAINING STARCH GRAFT COPOLYMER, final judgment adverse to the patentee, was rendered June 23, 1983, as to claims 1-4 and 7-11.

[*Official Gazette November 15, 1983.*]